(12) United States Patent
Shami

(10) Patent No.: US 9,849,924 B2
(45) Date of Patent: Dec. 26, 2017

(54) VEHICLE INCLUDING AN AERODYNAMIC SYSTEM CONFIGURED TO SELECTIVELY VARY AN AERODYNAMIC FORCE ACTING ON THE VEHICLE

(71) Applicant: GM GLOBAL TECHNOLOGY OPERATIONS LLC, Detroit, MI (US)

(72) Inventor: Constandi J. Shami, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 5 days.

(21) Appl. No.: 14/960,612

(22) Filed: Dec. 7, 2015

(65) Prior Publication Data

US 2017/0158262 A1   Jun. 8, 2017

(51) Int. Cl.
*B62D 37/02* (2006.01)
*B62D 35/00* (2006.01)
(Continued)

(52) U.S. Cl.
CPC ........... *B62D 37/02* (2013.01); *B62D 35/005* (2013.01); *B62D 35/007* (2013.01); *B62D 35/02* (2013.01); *G05D 3/00* (2013.01)

(58) Field of Classification Search
CPC ...... B62D 37/02; B62D 35/007; B62D 35/02; B62D 7/159; B60G 17/0162; B60G 2400/0523; B60G 2400/104; B60G 2400/204; B60G 2400/41; B60G 2800/01; B60G 2800/16; B60T 2230/02; B60T 8/172; B60W 2520/14; B64C 2201/088; B64C 39/024; Y10S 180/903; G05D 3/00

USPC ...... 701/1, 38, 41, 49, 124, 37; 180/15, 209, 180/311; 72/483; 244/2, 7 B; 296/180.1, 180.5; 280/87.041, 124.103, 280/789, 124.1; 702/141

See application file for complete search history.

(56) References Cited

U.S. PATENT DOCUMENTS 4,860,465 A * 8/1989 Brandt .................... B60B 15/26
180/15
5,752,408 A * 5/1998 Huckabee ................. B60S 5/00
72/483

(Continued)

*Primary Examiner* — Mussa A Shaawat
*Assistant Examiner* — Sanjeev Malhotra
(74) *Attorney, Agent, or Firm* — Quinn IP Law

(57) ABSTRACT

A vehicle includes a body, an aerodynamic element, a movement mechanism, a plurality of sensors, and a controller. The body is located along a longitudinal axis and a lateral axis. The aerodynamic element intersects ambient airflow, which generates an aerodynamic force. The movement mechanism moves the aerodynamic element, relative to the body, along the longitudinal and lateral axes. The sensors collectively generate input signals corresponding to an operating condition of the vehicle. The controller determines a current position of the movement mechanism, corresponding to a current location of the aerodynamic element on the axes and determines a desired position of the movement mechanism, corresponding to a desired location of the aerodynamic element on the axes. The controller transmits a movement signal to the movement mechanism to change position from the current position to the desired position, such that the aerodynamic element moves from the current location to the desired location.

17 Claims, 4 Drawing Sheets

(51) Int. Cl.
*B62D 35/02* (2006.01)
*G05D 3/00* (2006.01)

(56) References Cited

U.S. PATENT DOCUMENTS

| | | | | |
|---|---|---|---|---|
| 6,129,306 | A * | 10/2000 | Pham | B64C 37/00 244/2 |
| 8,226,120 | B2 * | 7/2012 | Berg | B62J 6/02 180/311 |
| 8,960,770 | B2 * | 2/2015 | De Luca | B62D 35/007 296/180.5 |
| 8,979,102 | B1 * | 3/2015 | Prentice | B62D 35/00 280/124.1 |
| 9,283,999 | B2 * | 3/2016 | Wolf | B62D 35/007 |
| 9,403,564 | B1 * | 8/2016 | Al-Huwaider | B62D 35/007 |
| 2003/0075950 | A1 * | 4/2003 | Rees | B62D 35/007 296/180.1 |
| 2003/0085562 | A1 * | 5/2003 | Sparling | B60G 5/00 280/789 |
| 2003/0093190 | A1 * | 5/2003 | Mori | B60G 17/019 701/1 |
| 2003/0122335 | A1 * | 7/2003 | Beck | A63C 17/01 280/87.041 |
| 2004/0036320 | A1 * | 2/2004 | Rees | B62D 35/007 296/180.1 |
| 2005/0275181 | A1 * | 12/2005 | MacIsaac | B60G 3/01 280/124.103 |
| 2007/0145776 | A1 * | 6/2007 | Grave | B62D 35/007 296/180.5 |
| 2008/0201038 | A1 * | 8/2008 | Jung | B60T 8/172 701/41 |
| 2008/0281489 | A1 * | 11/2008 | Le Vourch | B62D 7/159 701/41 |
| 2009/0008175 | A1 * | 1/2009 | Donaldson | B66F 11/044 180/209 |
| 2009/0138191 | A1 * | 5/2009 | Engelhard | G01G 23/3735 701/124 |
| 2009/0171530 | A1 * | 7/2009 | Bousfield | B62D 37/02 701/37 |
| 2009/0234537 | A1 * | 9/2009 | Tomida | B60G 17/0162 701/38 |
| 2010/0252690 | A1 * | 10/2010 | Hothi | B64C 39/024 244/7 B |
| 2012/0286102 | A1 * | 11/2012 | Sinha | B64C 15/00 244/7 B |
| 2013/0221701 | A1 * | 8/2013 | De Luca | B62D 37/02 296/180.5 |
| 2013/0226414 | A1 * | 8/2013 | De Luca | B62D 37/02 701/49 |
| 2014/0365078 | A1 * | 12/2014 | Gerecke | B62D 6/003 701/41 |
| 2015/0073744 | A1 * | 3/2015 | Herrera | B60W 40/076 702/141 |
| 2015/0232135 | A1 * | 8/2015 | Beierl | B62D 37/02 296/180.1 |
| 2015/0353148 | A1 * | 12/2015 | Wolf | B62D 35/007 296/180.5 |
| 2016/0236728 | A1 * | 8/2016 | Al-Huwaider | B62D 35/007 |
| 2016/0304139 | A1 * | 10/2016 | Handzel, Jr. | B62D 35/007 |

* cited by examiner

VEHICLE INCLUDING AN AERODYNAMIC SYSTEM CONFIGURED TO SELECTIVELY VARY AN AERODYNAMIC FORCE ACTING ON THE VEHICLE

TECHNICAL FIELD

The present disclosure is related to a vehicle including an aerodynamic system configured to selectively vary aerodynamic forces acting on the vehicle.

BACKGROUND

Aerodynamics is a factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds. Aerodynamics may also be utilized to achieve downforce in high-performance vehicles in order to improve vehicle traction and cornering abilities. The study is typically used to shape vehicle bodywork for achieving a desired compromise among the above characteristics for specific vehicle use.

SUMMARY

One aspect of the disclosure provides a vehicle having a center of gravity. The vehicle includes a body, an aerodynamic element, a movement mechanism, a plurality of sensors, and a controller. The body extends along a longitudinal axis, between a forward end and a rearward end. The forward end is configured to face an oncoming ambient airflow when the vehicle is in motion relative to a road surface. The body extends along a lateral axis, perpendicular to the longitudinal axis, between a first side and a second side.

The aerodynamic element is movably attached to the body and is arranged to intersect the ambient airflow such that the ambient airflow circulates about the aerodynamic element and generates an aerodynamic force. The movement mechanism movably couples the aerodynamic element and the body. The movement mechanism is configured to selectively move the aerodynamic element, relative to the body, along the longitudinal axis and/or the lateral axis. The sensors are configured to collectively generate input signals corresponding to an operating condition of the vehicle, as the vehicle is in motion relative to the road surface.

The controller is in operative communication with the movement mechanism and the plurality of sensors. The controller is operable to determine a desired location of the aerodynamic element, determine a desired position of the movement mechanism corresponding to the desired location of the aerodynamic element, and transmit a movement signal to the movement mechanism to change position to the desired position and thereby change location of the aerodynamic element to the desired location.

Another aspect of the disclosure provides an aerodynamic system, for a vehicle including a body located along a longitudinal axis and a lateral axis and a plurality of sensors configured to collectively generate input signals corresponding to an operating condition of the vehicle. The aerodynamic system includes an aerodynamic element, a movement mechanism, and a controller.

The aerodynamic element is configured to be movably attached to the body and is configured to be arranged to intersect the ambient airflow such that the ambient airflow circulates about the aerodynamic element and generates an aerodynamic force on the vehicle. The movement mechanism is configured to movably couple the aerodynamic element and the body. The movement mechanism is configured to selectively move the aerodynamic element, relative to the body, along the longitudinal axis and/or the lateral axis. The controller is configured to be in operative communication with the movement mechanism and the plurality of sensors. The controller is operable to determine a current position of the movement mechanism, corresponding to a current location of the aerodynamic element along the longitudinal axis and/or the lateral axis and to determine a desired position of the movement mechanism, corresponding to a desired location of the aerodynamic element along the longitudinal axis and/or the lateral axis. The controller is also configured to transmit a movement signal to the movement mechanism to change position from the current position to the desired position, such that the aerodynamic element moves from the current location to the desired location along the longitudinal axis and/or the lateral axis.

Another aspect of the disclosure provides a method of controlling an aerodynamic force acting on a vehicle that has a body and an aerodynamic element configured to intersect an ambient airflow as the vehicle moves through an ambient airflow. The method includes determining, with a controller, a desired location of the aerodynamic element and determining a desired position of the movement mechanism corresponding to the desired location of the aerodynamic element. A movement signal is transmitted to the movement mechanism to change position to the desired position and thereby change location of the aerodynamic element to the desired location.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
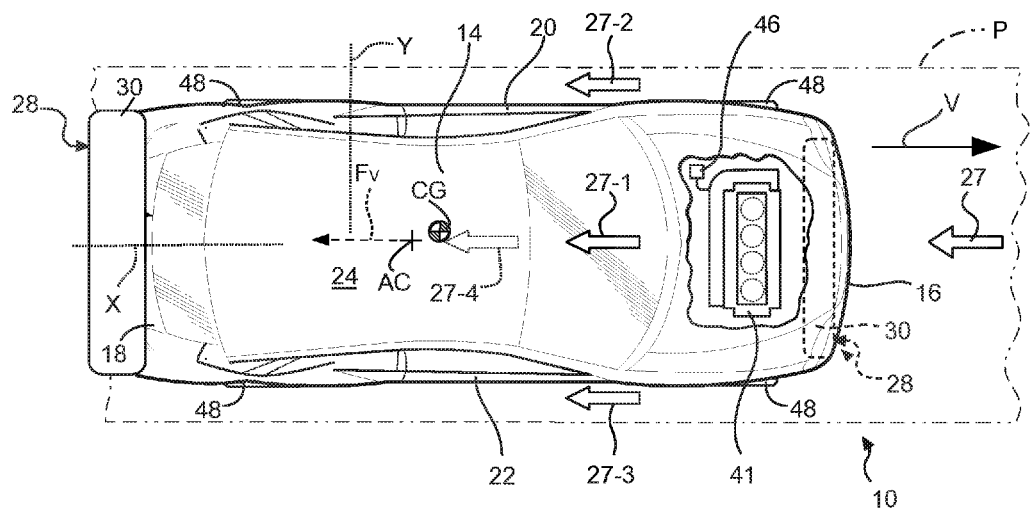
FIG. 1 is a schematic top view of a vehicle including a vehicle body and an aerodynamic element, with an ambient airflow being directed along the aerodynamic elements and the vehicle body.

Referring to the drawings, wherein like reference numbers refer to like components, FIG. 1 shows a schematic view of a motor vehicle 10 positioned relative to a road surface 12. The vehicle 10 includes a vehicle body 14 with a center of gravity CG. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion 26. The front end 16 and the rear end 18 are disposed in spaced relationship to one another along a longitudinal axis X.

With continued reference to FIG. 1, the left side 20 and right side 22 are disposed in spaced relationship to one another along a lateral axis Y, and span the distance between the front end 16 and the rear end 18. The lateral axis Y may be positioned transversely to the longitudinal axis X to form an X-Y coordinate plane, or X-Y plane P. A passenger compartment (not shown) of the vehicle 10 is generally bounded by the front and rear ends 16, 18 and the left and right sides of the body 14. As understood by those skilled in the art, the front end 16 is configured to face an oncoming ambient airflow 27 when the vehicle 10 is in motion relative to the road surface 12. When the vehicle 10 is in motion, the flow of the oncoming ambient airflow 27 is substantially parallel to the body plane P, and along the longitudinal axis X.

The vehicle 10 may also include a steering wheel 56 and road wheels 48. As is known, the steering wheel 56 is configured to receive an input from an operator of the vehicle 10 to turn at least one road wheel 48 of the vehicle 10 to thereby change direction of travel of the vehicle 10.

Figure 2:
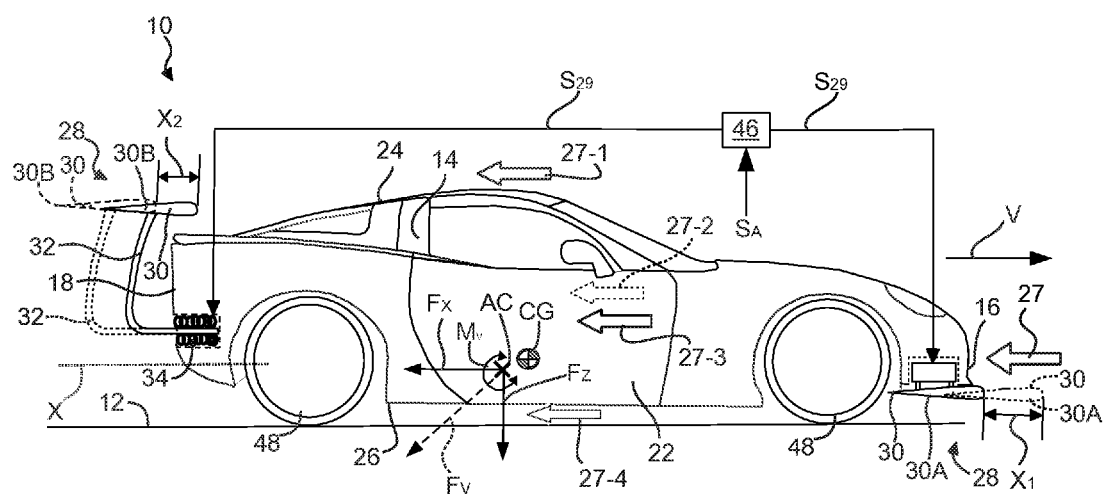
FIG. 2 is a side view of the vehicle including the vehicle body and the aerodynamic elements, each configured to move relative to the vehicle body.

With reference to FIGS. 1 and 2, as the vehicle 10 moves relative to the road surface 12, the ambient airflow 27 passes around the vehicle body 14 and splits into respective first airflow portion 27-1, second airflow portion 27-2, third airflow portion 27-3, and fourth airflow portion 27-4. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 (shown in FIG. 2) passes under the vehicle body 14, between the underbody portion 26 and the road surface 12.

As shown in FIGS. 1 and 2, the vehicle 10 also includes one or more aerodynamic systems 28. Each aerodynamic system 28 includes an aerodynamic element 30 and at least one movement mechanism 29, i.e., actuator. As described in more detail below, the vehicle 10 includes a controller 46 in operative communication with the movement mechanism(s) 29. The controller 46 is programmed to execute logic embodying a method 100 of determining a required location of the aerodynamic element(s) 30, relative to the vehicle body 14, along the X-Y plane P. The controller 46 is configured to provide a movement signal $S_{29}$ to at least one movement mechanism 29, such that the movement mechanism 29 moves the aerodynamic element 30, relative to the vehicle body 14, to the required location on the X-Y plane P.

The aerodynamic element 30 may be, for example, an air dam, a spoiler, tray, and the like, configured to intersect airflow to direct the ambient airflow 27 along the vehicle body 14, as the vehicle 10 moves relative to the road surface 12. The aerodynamic element(s) 30 may be wing-shaped. "Wing-shaped" is herein defined as having an airfoil defined by a cross-section of the aerodynamic element 30, obtained by the intersection of the aerodynamic element 30 with a plane perpendicular to the lateral axis Y. The aerodynamic element 30 may be attached to the top body portion 24, proximate the rear end 18, or attached to the underbody portion 26, proximate the front end 16 of the vehicle body 14. The aerodynamic element 30 may be attached to other locations of the vehicle 10, as desired. The aerodynamic element 30 is configured to be selectively moved, relative to the vehicle body 14, along the longitudinal axis X and/or the lateral axis Y, to a required position on the X-Y plane P, as determined by the controller 46.

With reference to FIGS. 1 and 2, as the vehicle 10 travels along the road surface 12, the vehicle 10 moves through the ambient airflow 27, where a velocity of the air around a surface of the vehicle 10 varies. The variation in air velocity produces a corresponding variation in pressure acting on the surface of the vehicle 10 and, thus, a corresponding variation in aerodynamic forces acting on the surface of the vehicle 10. It should be appreciated that the surface of the vehicle 10 includes the combined exterior surfaces of the vehicle body 14, the aerodynamic element(s) 30, road wheels 48, side mirrors, and the like. As known in the art, an average location of the pressure variation is a center of pressure.

With reference to FIG. 2, an aerodynamic force $F_V$ is resolved into two components, downforce $F_Z$ and drag $F_X$, which act through the center of pressure during operation of the vehicle 10. However, the variation in pressure on the surface of the vehicle 10 may also impart a torque to the vehicle 10, referred to as an aerodynamic moment $M_V$. An aerodynamic center AC is a location on the vehicle where the aerodynamic moment $M_V$, is constant, as the vehicle 10 travels along the road surface 12 at a forward velocity (arrow V in FIG. 1). Therefore, for purposes of this discussion the aerodynamic force $F_V$ is applied at the aerodynamic center AC, which is a function of, in part, the velocity (arrow V) and the longitudinal profile of the vehicle 10. Thus, if the longitudinal profile and/or the velocity (arrow V) of the vehicle 10 changes, the location of the aerodynamic center AC would also change.

The longitudinal profile is the side view profile of the vehicle 10, along the longitudinal axis X, as illustrated in FIG. 2. The longitudinal profile includes the vehicle body 14 the aerodynamic element(s) 30, and any other exterior components, presenting the surface for the ambient airflow 27 to flow about, and act on, when the vehicle 10 is traveling on the road surface 12 at a forward velocity (arrow V in FIG. 1). Thus, changing a location of one or more aerodynamic elements 30 along the longitudinal axis X and/or lateral axis Y, relative to the vehicle body 14, will change the longitudinal profile of the vehicle 10. As such, assuming the forward velocity (arrow V) of the vehicle 10 remains constant, a translation of the aerodynamic element(s) 30 along the longitudinal axis X and/or lateral axis Y, i.e., on the X-Y plane P, relative to the vehicle body 14, will result in a corresponding change in location of the aerodynamic center AC, while the center of gravity CG may remain substantially unchanged.

Likewise, assuming the location of the aerodynamic element(s) 30, relative to the vehicle body 14, remains unchanged, the location of the aerodynamic center AC will change, as a function of a change in the forward velocity (arrow V) of the vehicle 10.

Figure 3:
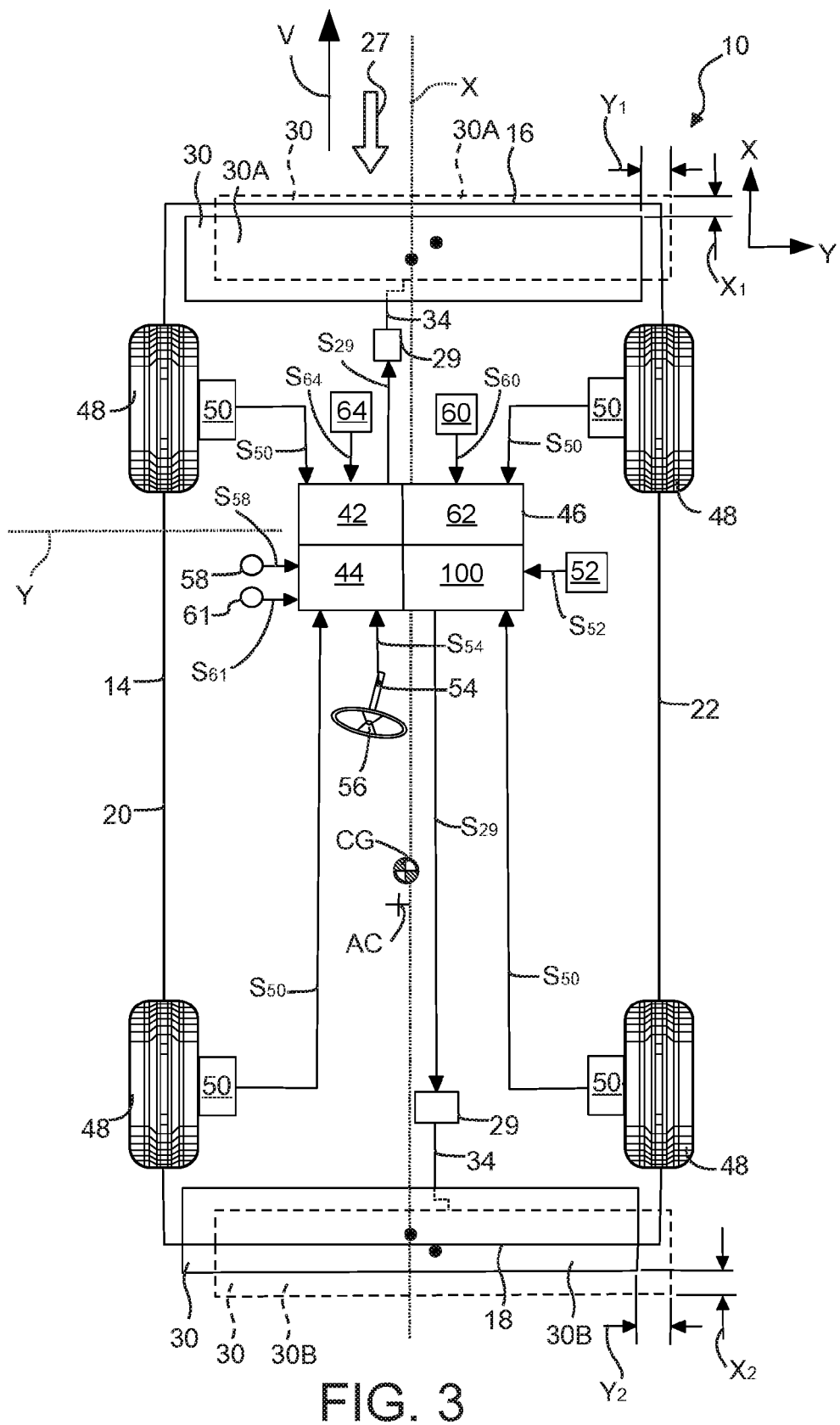
FIG. 3 is a schematic, diagrammatic top view of the vehicle including the vehicle body, a controller, a pair of movement mechanisms, a pair of aerodynamic elements, and a plurality of sensors, transmitting input signals to the controller.

Therefore, the controller 46 may be configured such that the vehicle 10 can operate in more that one vehicle dynamics operating mode. The vehicle dynamics operating modes may correspond to a desired dynamic performance and handling of the vehicle 10, as the vehicle 10 travels along the road surface 12. As explained in more detail below, by way of a non-limiting example, the vehicle dynamics operating modes may include a continuously active mode, a driver-defined track performance mode, a disabled mode, and the like. In order to operate in any of the vehicle dynamics operating modes, the controller 46 determines a required location of each aerodynamic element 30 on the X-Y plane P. As such, the controller 46 provides at least one movement signal $S_{29}$ to one or more corresponding movement mechanism(s) 29, corresponding to a respective aerodynamic element 30. With reference to FIG. 3, a first aerodynamic element 30A and a second aerodynamic element 30B are shown. Upon receipt of the movement signal $S_{29}$, the movement mechanism(s) 29 actuates to move the respective aerodynamic element 30 (i.e., first aerodynamic element 30A and/or second aerodynamic element 30B) to the required position, i.e., a first distance $X_1$ along the longitudinal axis X and/or a second distance $Y_1$ along the lateral axis Y, for the first aerodynamic element 30A and/or a first distance $X_2$ along the longitudinal axis X and/or a second distance $Y_2$ along the lateral axis Y, for the second aerodynamic element 30B. As can be appreciated, the aerodynamic center AC of the vehicle 10 is dependent, in part, upon the location of the aerodynamic element(s) 30A, 30B relative to the vehicle body. The aerodynamic elements 30A, 30B may be moved in unison, or independent of one another, along one or both of the longitudinal and lateral axes X, Y, relative to the vehicle body 14. It should also be appreciated movement of both of the aerodynamic elements 30A, 30B may not be required to move the aerodynamic center AC of the vehicle 10. Further, the first and second aerodynamic elements 30A, 30B may be referred to as aerodynamic elements 30, for simplifying the description.

Thus, in some vehicle dynamics operating modes, such as the continuously active mode, it may be desirable to maintain the aerodynamic center AC in a specified location on the X-Y plane P, relative to the location of the center of gravity CG, while the vehicle speed (arrow V) varies. In such instances, the controller 46 is configured to transmit movement signals $S_{29}$ to at least one movement device(s) 29, on a real-time basis, to move the location of the corresponding aerodynamic element 30 on the X-Y plane P, such that the location of the aerodynamic center AC on the X-Y plane P is maintained.

In some vehicle dynamics operating modes, such as when the vehicle speed (arrow V) is increasing, it may be desirable for the aerodynamic center AC to be selectively located forward of the center of gravity CG on the longitudinal axis X (i.e., between the front end 16 and the center of gravity CG) in order to reduce drag and/or improve fuel economy. It may also be desirable for the aerodynamic element(s) 30 to be selectively located rearward of the center of gravity CG on the longitudinal axis X (i.e., between the rear end 18 in the center of gravity CG) when the vehicle 10 is undergoing heavy braking or deceleration, to allow the vehicle 10 to "squat" during deceleration. Therefore, in order to move the aerodynamic center AC, the controller 46 is configured to transmit the movement signal $S_{29}$ to at least one movement mechanism 29 or actuator, such that the respective aerodynamic element 30A, 30B moves a requisite first distance $X_1/X_2$ along the longitudinal axis X and/or second distance $Y_1/Y_2$ along the lateral axis Y. Therefore, the aerodynamic system 28 may include more than one movement mechanism 29, each configured to move the respective aerodynamic element 30 (e.g., 30A and/or 30B shown in FIG. 3) along the X-Y plane P in a corresponding longitudinal and/or lateral axial X direction and/or Y direction.

It may also be desirable for the aerodynamic element(s) 30 to be selectively located "inward" of the center of gravity CG when the vehicle 10 is driving around a curve, to offset body roll motions. In one non-limiting example, the vehicle 10 may be operating in a continuously active mode. In the continuously active mode, when driving the vehicle 10 is driving around a curve on the road surface 12, the controller 46 may selectively send instructions to one or more movement mechanism(s) 29 to move the associated aerodynamic element 30 on the X-Y plane P, such that the aerodynamics center AC is located to be inward of the center of gravity CG.

With reference to FIG. 2, the aerodynamic system 28 is movably connected to the vehicle body 14, via one or more of the movement mechanisms 29. In one embodiment, the movement mechanism 29 may include at least one stanchion 32 and at least one actuator 34. The stanchion 32 may operatively extend between the aerodynamic element 30 and the actuator 34. The actuator 34 may be operatively attached to the vehicle body 14. As such, actuator 34 is configured to selectively move the aerodynamic element 30, relative to the vehicle body 14, via the respective stanchion 32. The actuator 34, in turn, may be operatively attached to the vehicle body 14. As such, in one non-limiting example, in order to increase vehicle 10 traction with the road surface 12, when the aerodynamic system 28 is mounted on, or proximate, the front end 16, movement of the respective aerodynamic element 30 relative to the body 14 may be employed to increase a respective downforce and/or drag, acting at the front of the vehicle. Likewise, when the aerodynamic system 28 is mounted on, or proximate, the rear end 18, movement of the respective aerodynamic element 30 relative to the body 14 may be employed to increase a respective downforce and/or drag, acting at the rear of the vehicle.

Figure 4:
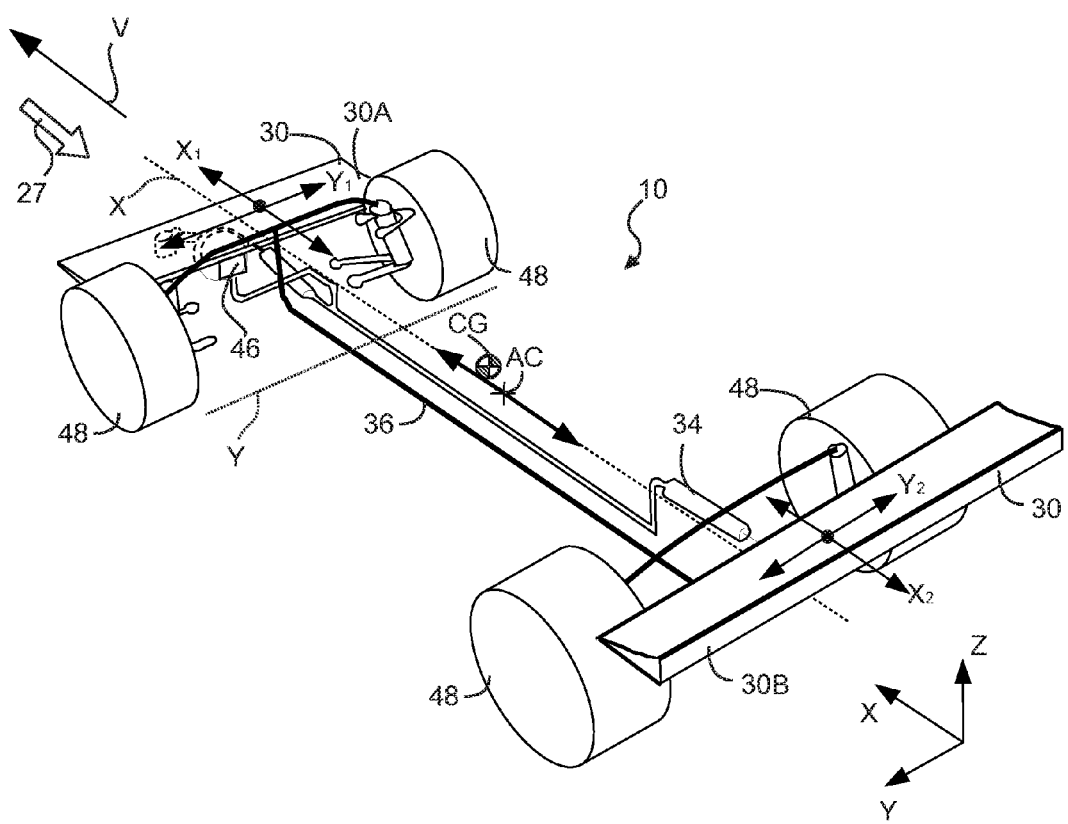
FIG. 4 is a schematic, diagrammatic rear perspective view of the vehicle, illustrating one possible embodiment of the movement mechanism for moving the aerodynamic elements, relative to the vehicle body.

Referring now to FIG. 4, the movement mechanism 29 may be configured as a hydraulic and mechanical system that includes a hydraulic actuator 34 and a mechanical pump (not shown). The hydraulic actuator 34 may be configured with pressurized hydraulic lines 36 that are operatively attached to one or more hydraulic linear actuators 34. In one embodiment, the hydraulic actuator 34 may be a pump, which would provide a quick response and may be operatively attached to brake lines (not shown) existing within the vehicle 10. Therefore, the hydraulic pump actuator 34 would be controllable using the same module and hardware used by existing brake systems.

The mechanical pump 34 may be configured to build pressure in the hydraulic lines 36, which would then power a linear hydraulic actuator 34 configured to translate the aerodynamic element 30 relative to the vehicle body 14, along the longitudinal axis X and/or the lateral axis Y. It should be appreciated, however, that movement mechanisms 29 are not limited to those described herein, as other movement mechanisms 29 may be used, as well.

With reference to FIG. 3, the controller 46 is operatively connected to the movement mechanism 29 of the aerodynamic system 28. The controller 46 is configured, i.e., constructed and programmed, to regulate movement mechanism(s) 29. The controller 46 may be configured as a central processing unit (CPU) configured to regulate operation of an internal combustion engine 41 (shown in FIG. 1), a hybridelectric powertrain (not shown), or other alternative types of powerplants, as well as other vehicle systems, or a dedicated controller. In order to appropriately control operation of the mechanism 36, the controller 46 includes a processor 44 and a memory 42, at least some of which is tangible and non-transitory. The memory 42 may be any recordable medium that participates in providing computer-readable data or process instructions. Such a medium may take many forms, including but not limited to non-volatile media and volatile media.

Non-volatile media for the controller 46 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory 42 of the controller 46 may also include a floppy disk, a flexible disk, hard disk, magnetic tape, any other magnetic medium, a CD-ROM, DVD, any other optical medium, etc. The controller 46 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 46 or accessible thereby may be stored in the memory 42 and automatically executed to provide the required functionality.

With continued reference to FIG. 3, the vehicle 10 includes a plurality of sensors, each configured to provide an input signal to the controller 46. As such, the vehicle 10 may include a plurality of wheel speed sensors 50, arranged on the vehicle body 14 for detecting rotating speeds of each road wheel 48. Each wheel speed sensor 50 may be configured to communicate the detected wheel speed of the respective wheel 48 to the controller 46 as a wheel speed signal $S_{50}$, while the controller 46 may be configured to correlate the data received from the respective sensors 50 to a road speed (arrow V) of the vehicle 10. The vehicle 10 may also include one or more accelerometers 52 configured to measure a longitudinal acceleration, a lateral acceleration, and/or a yaw rate on the vehicle body 14, relative to the road surface 12, and communicate the detected acceleration to the controller 46 as an acceleration signal $S_{52}$. Additionally, the vehicle 10 may include a steering angle sensor 54, positioned with respect to the steering wheel 56. The steering angle sensor 54 is configured to detect an angle of the steering wheel during operation of the vehicle 10. An intended direction of the vehicle 10 may be identified by the steering wheel angle detected by the steering angle sensor 54 and communicated to the controller 46 as a steering angle signal $S_{54}$. The controller 46 may also be configured to estimate a side slip angle of the vehicle 10 by using the measured steering wheel angle, the yaw rate, and the vehicle speed (arrow V).

The vehicle 10 may also include a throttle level sensor 58 corresponding to a torque request, e.g., an amount of force applied to an accelerator pedal (not shown). The amount of the torque request is transmitted to the controller 46 as a torque request signal $S_{58}$. Additionally, the vehicle 10 may include an engine torque sensor 60 configured to measure the amount of engine torque being delivered by the engine 41. The measured amount of engine torque maybe communicated to the controller 46, by the engine torque sensor 60, as an engine torque signal $S_{60}$. The vehicle 10 may also include a brake apply sensor 61 configured to sense the amount of braking being requested for the vehicle 10 to decelerate. The brake apply sensor 61 is configured to communicate the requested amount of braking to the controller 46 as a brake apply signal $S_{61}$.

The sensors 50, 52, 54, 58, 60, 61, 62, as described herein, will be collectively referred to as sensors A. Likewise, the input signals $S_{50}$, $S_{52}$, $S_{54}$, $S_{58}$, $S_{60}$, $S_{61}$, $S_{62}$, as described herein, which will be collectively referred to as input signals $S_A$. Further, it should be appreciated that the vehicle 10 may include sensors in addition to those described herein. The controller 46 may be programmed with one or more algorithms and/or a look-up tables 62 establishing a correspondence between the various input signals $S_A$ received from the sensors A. The look-up tables 62 may be developed empirically during validation and testing of the vehicle.

In one embodiment, the controller 46 may be programmed to determine the side slip of the vehicle 10 relative to the road surface 12. The side slip of the vehicle 10 may include a measure of how much each of the road wheels 48 has slipped in a direction that is generally perpendicular to the longitudinal axis X, which identifies that the vehicle has deviated from the intended direction or path along the road surface 12 as identified by the steering wheel angle measured by the steering angle sensor 54. The controller 46 may be programmed to compare the measured steering wheel angle, yaw rate, and vehicle speed (arrow V) to determine how much the vehicle 10 had deviated from its intended direction or path, relative to the longitudinal axis X. The controller 46 may also be programmed to control the slip of the vehicle 10 relative to the road surface 12 by selectively moving the aerodynamic element(s) 30 relative to the vehicle body 14, via the movement mechanism(s) 29, in response to how much the vehicle 10 has deviated from its intended path. The adjusted position of the aerodynamic element(s) 30 relative to the vehicle body 14 would then urge the vehicle 10 to return from the actual vehicle heading to the desired heading being commanded by an operator of the vehicle at the steering wheel 56.

In another non-limiting example, the controller 46 may be programmed with one or more vehicle dynamics operating modes. The operating modes may include, but should not be limited to a continuously active mode, a driver-defined track performance mode, and the like. The vehicle 10 may be configured such that one of the desired operating modes may be selected, or no mode may be selected at all. In the vehicle dynamics operating modes, the controller 46 is configured to send the movement signal $S_{29}$ to the respective movement mechanism(s) 29 to, in turn, move the aerodynamic element(s) 30 (e.g., 30A and/or 30B shown in FIG. 3) the first distance $X_1/X_2$ along the longitudinal axis X and/or the second distance $Y_1/Y_2$ along the lateral distance Y, as a function of one or more of the input signals S received from the respective sensors. However, it should be appreciated that the distances $X_1/X_2$ and/or $Y_1/Y_2$ corresponding to a required location of the aerodynamic element 30 (e.g., 30A and/or 30B shown in FIG. 3) may vary as a function of the selected vehicle dynamics operating mode.

As mentioned above, the vehicle dynamics operating modes may include the continuously active mode, driver defined track performance mode, the disabled mode, and the like. The continuously active mode maybe configured such that the location of the aerodynamics center AC is selectively controlled by movement of the aerodynamic element 30 relative to the center of gravity CG of the vehicle body 14. More specifically, in the continuously active mode, it may be desirous to keep the aerodynamic center AC continuously aligned with the center of gravity CG, or at a specified location relative to the center of gravity CG, while the vehicle 10 operates. Therefore, in the continuously active mode, the position of the aerodynamic element(s), relative to the vehicle body 14, may be continuously adjusted on a real-time basis during operation of the vehicle 10, in response to the detected yaw rate, steering wheel angle, rotating speed of the road wheel, slip of the road wheel(s) 48 relative to the road surface 12, weight of the vehicle (including occupants), and/or the like.

In the driver defined track performance mode, the required location of the aerodynamic element 30 maybe programmed or otherwise recorded in the memory 42 of the controller 46. In one embodiment, one or more locations of the aerodynamic element 30, relative to the vehicle body 14, may be defined and recorded in the memory 42 by the operator of the vehicle 10. The location of the aerodynamic element 30, relative to the vehicle body 14, may be selected to provide a desired dynamics and handling performance for a desired style of driving course, e.g., high-speed road course, autocross course, oval track, dirt track, formula track, and the like. Selection of the driver defined track performance mode would result in the controller 46 sending a movement signal $S_{29}$ to actuate the movement mechanism(s) 29. Actuation of the movement mechanism 29 results in movement of the aerodynamic element 30, relative to the vehicle body 14, to the required location. Then, the aerodynamic element 30 would remain fixed in the required location, relative to the vehicle body 14, so long as the desired driver defined track performance mode remains the selected mode.

It should be appreciated that in one driver defined track performance mode, the aerodynamic system 28 may be configured to provide electronic adjustability and fine-tuning of the location of the aerodynamic element 30, relative to the center of gravity CG and/or the vehicle body 14. Such electronic adjustability would be in response to location details input to the controller by the operator of the vehicle 10. Therefore, the operator may fine-tune the location of the aerodynamic element 30, without having to use wrenches or other tools. Further, the controller 46 may be configured such that movement signals $S_{29}$ to the movement mechanism 29 may be disabled when in a race mode.

In another embodiment of the driver defined track performance mode, the controller 46 may be programmed with more than one tuning mode, with each tuning mode providing unique vehicle dynamics and handling characteristics. The tuning modes may, for example, include an aggressive mode, a stability mode, and the like. Selection of the aggressive mode may result in the vehicle 10 providing aggressive dynamics and handling characteristics to allow for quick changes in vehicle 10 direction while driving. Likewise, selection of the stability mode may result in the vehicle 10 having high downforce.

Selection of the aggressive mode, for example, may result in a movement of the aerodynamic element 30, from a location corresponding to the disabled mode (neutral location), to the required location corresponding to the aggressive mode. In one non-limiting example, the aerodynamic element may move from the along the longitudinal axis X a distance of between 15 and 16 inches (in), from the neutral location. Similarly, the stability mode may be configured to provide a range of motion of between 6 to 8 in, from a neutral location, i.e., a pre-defined "home" or "stowed" location of the aerodynamic element 30 on the X-Y plane P. It should be appreciated that the range of motion is not limited to these ranges, but may include other ranges to provide desired vehicle handling characteristics. Further, it should be appreciated that the range of motion is not limited to movement along the longitudinal axis X, but may also be incorporated to provide movement along the lateral axis Y.

Additionally, when the disabled mode is selected, the aerodynamic element 30 may remain in the current position, and the controller is configured to not respond to any input commands regarding setting a position of the aerodynamic element 30 on the X-Y plane P. Alternatively, when the disabled mode is determined by the controller 46 to be the selected mode, the movement mechanism(s) 29 function to move the aerodynamic element 30 to a predefined neutral position. By way of a non-limiting example, the predefined neutral position may be associated with the instance when the operator of the vehicle would not want any aerodynamic input from the aerodynamic element 30.

Referring now to FIG. 4, an example embodiment of the method 100 begins with step 110, wherein vehicle information is recorded in the memory location 42, within the controller 46. The vehicle information may include, but should not be limited to, the location of the center of gravity CG, a location of the aerodynamic element 30 in the neutral location, a location of the aerodynamic element 30 associated with one or more tuning modes, and the like. The location of the center of gravity CG may be recorded in the memory location 42 or may be calculated, based on a current mass of the vehicle, including vehicle occupants, fuel, cargo, and the like. The method then proceeds to step 111.

At step 111, the controller 46 determines a current location of the aerodynamic element 30, relative to the vehicle body 14, on the X-Y plane P. The current location of the aerodynamic element 30 may correspond to a current position of one or more associated movement mechanism(s) 29, since actuation of the movement mechanism(s) 29 results in a corresponding movement of the aerodynamic element 30, relative to the vehicle body 14. As such, it should be appreciated that an association of various positions of the movement mechanism(s) 29, relative to the various locations of the aerodynamic element 30, may be recorded in one or more look-up tables 62 and/or determined via one or more algorithms (see step 110). Further, as described above, the position of the movement mechanism 29 and/or the location of the aerodynamic element 30 on the X-Y plane P maybe determined using positional detectors, such as Hall-effect sensors and/or resolvers, as is known.

Figure 5:
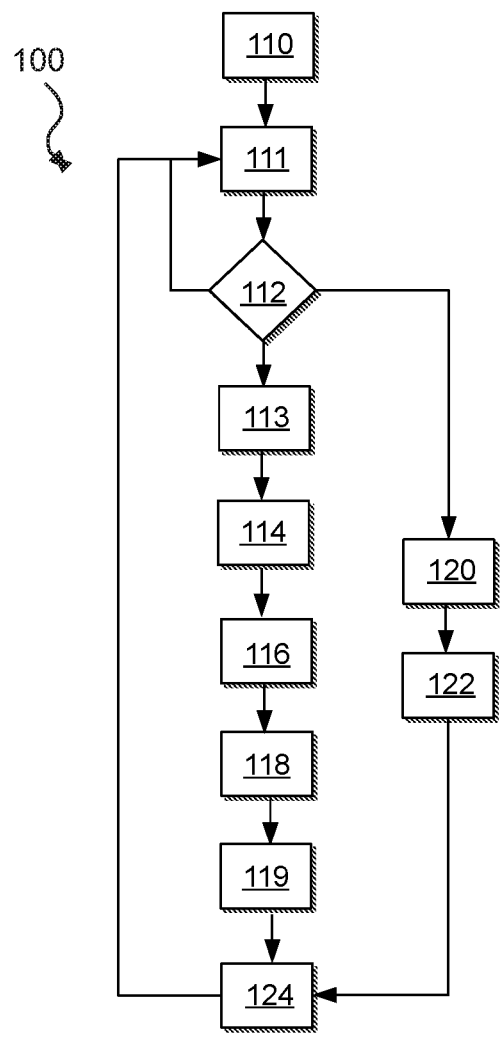
FIG. 5 is a flow chart describing a method for controlling movement of the aerodynamic element, relative to the vehicle body.

Then, at step 112, the controller 46 determines a required or requested operating mode of the vehicle 10. The required operating mode may be a disabled mode, a continuously active mode, a driver defined track performance mode, and the like. When the required operating mode is the disabled mode, the method may return to step 111. Alternatively, although not shown in FIG. 5, the method may optionally repeat step 112 when the disabled mode is detected, until another operating mode is detected by the controller 46. When the controller 46 determines that the driver defined track performance mode is the required operating mode, the method may proceed directly to step 120.

At step 120, the controller 46 may receive a location signal S64 from an input interface 64, where the location signal S64 corresponds to a requested distance the movement mechanism(s) 29 must move to thereby cause the aerodynamic element 30 to move along the longitudinal axis X and/or the lateral axis Y to the required location. The input interface 64 may be any interface operatively attached to, or otherwise in operative communication with, the vehicle 10. The input interface 64 is configured to receive commands from an operator or another electronic device.

Next, the method proceeds to step 122, wherein the controller 46 may determine one or more values associated with the location signal $X_{64}$.

The method then proceeds to step 124, wherein the controller 46 transmits one or more movement signals $S_{29}$ to one or more associated movement mechanism(s) 29. The movement signals $S_{29}$, which may be a voltage or pressure, are based on the value(s) determined at step 122. Next, the method proceeds to step 124.

At step 124, the controller 46 transmits the movement signal(s) $S_{29}$ to the associated movement mechanism(s) 29 to move the movement mechanism 29 the requested distance, to thereby cause the aerodynamic element 30 to move to the required location on the X-Y plane P. Once step 124 is complete, the method may return to step 111.

However, returning to step 112, if the required operating mode is the continuously active mode, the method proceeds to step 113.

At step 113, the controller 46 receives at least one signal $S_A$ from a corresponding sensor A within the vehicle 10. As described above, the signal $S_A$ may be related to the wheel speed of at least one road wheel 48, the yaw rate, the steering angle of the steering wheel 56, the throttle level or torque request, the engine torque output, the brake level, and the like. It should be appreciated that there may be input signals provided to the controller 46 from additional sensors, as well as those described herein.

The method then proceeds to step 114, wherein the controller 46 estimates the current location of the aerodynamic center AC on the X-Y plane P. The estimation of the current location of the aerodynamic center AC may be based upon one or more of the input signals $S_A$ received from the sensors A, along with vehicle information that is recorded in the memory 42 (see step 110). By way of a non-limiting example, factors that may be used to calculate the current location of the aerodynamic center AC may include the wheel speed of at least one road wheel 48, the yaw rate, the steering angle of the steering wheel 56, the throttle level or torque request, the engine torque output, the brake level, and the like. The estimation of the aerodynamic center AC may also be determined based on using one or more algorithms, look-up tables 62, and the like. The look-up tables 62 may be based on an established correspondence between one or more of the vehicle yaw rate, vehicle speed V, throttle level or torque request, velocity of the airflow, mass of the vehicle 10, and/or the like. The look-up tables 62 may be developed empirically during validation and testing of the vehicle 10.

The method proceeds to step 116, wherein a required position of the aerodynamic center AC is determined. In addition to using the information recorded in the memory location 42, the required position of the aerodynamic center AC may also be determined as a function of the vehicle speed (arrow V), throttle level, engine torque request, longitudinal acceleration, lateral acceleration, yaw rate, steering angle, brake position, vehicle mass, and the like. The required position may be a position relative to the location of the center of gravity CG of the vehicle 10, on the X-Y plane P.

Next, the method proceeds to step 118, wherein a required location of the aerodynamic element 30 is determined on the X-Y plane P, i.e., along the longitudinal axis X and/or the lateral axis Y. More specifically, when the vehicle 10 is operating in the continuously active mode, a required location of the aerodynamic element 30, associated with the required location of the aerodynamic center AC, is determined by the controller 46, using one or more algorithms, look-up tables 62, in addition to using one or more of the input signals $S_A$. The required location of the aerodynamic element 30 may be determined as a function of the required position of the associated movement mechanism 29. Next, the method proceeds to step 119.

At step 119, the controller calculates a distance between the required position and the actual position of one or more movement mechanism(s) 29. Therefore, the distance between the required position and the current position of the movement mechanism(s) 29 corresponds to an amount of actuation required by the movement mechanism(s) 29 to achieve the required location of aerodynamic element 30 (and thus the required position of the aerodynamic center AC). It should be appreciated that movement of the aerodynamic element 30 along the longitudinal axis X and along the lateral direction Y may be achieved by articulation of one movement mechanism 29. Alternatively, movement along the longitudinal axis X and the lateral axis may be achieved by articulation of independent movement mechanisms 29, i.e., one movement mechanism 29 is associated with movement along the longitudinal axis X and another movement mechanism 29 is associated with movement along the lateral axis Y. Next, the method proceeds to step 124.

At step 124, as previously described, the controller 46 transmits one or more movement signals $S_{29}$ to the associated movement mechanism(s) 29. The movement signal $S_{29}$ corresponds to the distance the movement mechanism(s) 29 needs to move to cause the associated aerodynamic element 30 to move to the required location on the X-Y plane P. Next the method may repeat, by returning to step 111.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A vehicle having a center of gravity, the vehicle comprising:
    a body extending along a longitudinal axis, between a forward end and a rearward end, wherein the forward end is configured to face an oncoming ambient airflow when the vehicle is in motion relative to a road surface;
    wherein the body extends along a lateral axis, perpendicular to the longitudinal axis, between a first side and a second side;
    an aerodynamic element movably attached to the body and arranged to intersect the ambient airflow such that the ambient airflow circulates about the aerodynamic element and generates an aerodynamic force;
    a movement mechanism movably coupling the aerodynamic element and the body, wherein the movement mechanism is configured to selectively move the aerodynamic element, relative to the body, along a longitudinal axis and/or a lateral axis;
    a plurality of sensors configured to collectively generate input signals corresponding to an operating condition of the vehicle, as the vehicle is in motion relative to the road surface; and
    a controller in operative communication with the movement mechanism and the plurality of sensors, wherein the controller is operable to:
        determine a desired location of the aerodynamic element; determine a desired position of the movement mechanism corresponding to the desired location of the aerodynamic element;

transmit a movement signal to the movement mechanism to change position to the desired position and thereby change location of the aerodynamic element to the desired location;

determine a required location of an aerodynamic center of the vehicle along the longitudinal axis and/or the lateral axis, as a function of at least one of the input signals;

wherein the controller being operable to determine a desired position of the movement mechanism is further defined as the controller being operable to determine a desired position of the movement mechanism corresponding to the required location of the aerodynamic center of the vehicle along the longitudinal axis and/or the lateral axis; and wherein the controller being operable to transmit a movement signal is further defined as the controller being operable to transmit a movement signal to the movement mechanism to change position to the desired position to thereby change location of the aerodynamic element to the desired location and to thereby change location of the aerodynamic center to the required location.

2. The vehicle, as set forth in claim 1, wherein the controller is further defined as being operable to:

determine a current position of the movement mechanism; and determine a distance between the current position and the desired position of the movement mechanism;

wherein the controller being operable to transmit a movement signal to the movement mechanism is further defined as the controller being operable to transmit a movement signal to the movement mechanism to change position corresponding to the measured distance between the current position and the desired position of the movement mechanism to change position to the desired position by moving the measured distance.

3. The vehicle, as set forth in claim 2, wherein the controller is further defined as being operable to:

receive and process the input signals;

determine the current aerodynamic center of the vehicle, relative to the center of gravity of the body, as a function of at least one input signal; and determine the required aerodynamic center of the vehicle, relative to the center of gravity of the body, as a function of at least one input signal.

4. The vehicle, as set forth in claim 1, further comprising a throttle sensor and a steering wheel having a steering angle sensor, wherein the input signals include a throttle request for the throttle sensor and a steering angle for the steering angle sensor.

5. The vehicle, as set forth in claim 1, further comprising a set of accelerometers, wherein the input signals include acceleration signals for each of the accelerometers.

6. The vehicle, as set forth in claim 1, further comprising a plurality of road wheels and at least one wheel speed sensor operatively attached at least one of the road wheels, wherein the input signals include a wheel speed for the wheel speed sensor.

7. An aerodynamic system, for a vehicle including a body having a center of gravity and located along a longitudinal axis and a lateral axis, and including a plurality of sensors configured to collectively generate input signals corresponding to an operating condition of the vehicle, the aerodynamic system comprising:

an aerodynamic element configured to be movably attached to the body and configured to be arranged to intersect the ambient airflow such that the ambient airflow circulates about the aerodynamic element and generates an aerodynamic force on the vehicle;

a movement mechanism configured to movably couple the aerodynamic element and the body, wherein the movement mechanism is configured to selectively move the aerodynamic element, relative to the body, along the longitudinal axis and/or the lateral axis; and a controller configured to be in operative communication with the movement mechanism and the plurality of sensors, wherein the controller is operable to:

determine a current position of the movement mechanism, corresponding to a current location of the aerodynamic element along the longitudinal axis and/or the lateral axis;

determine a desired position of the movement mechanism, corresponding to a desired location of the aerodynamic element along the longitudinal axis and/or the lateral axis;

transmit a movement signal to the movement mechanism to change position from the current position to the desired position, such that the aerodynamic element moves from the current location to the desired location along the longitudinal axis and/or the lateral axis;

determine a current location of an aerodynamic center of the vehicle along the longitudinal axis and/or the lateral axis, as a function of at least one of the input signals;

determine a required location of the aerodynamic center of the vehicle along the longitudinal axis and/or the lateral axis, as a function of at least one of the input signals; and wherein the controller being operable to determine a desired position of the movement mechanism is further defined as the controller being operable to determine a desired position of the movement mechanism corresponding to the required location of the aerodynamic center of the vehicle along the longitudinal axis and/or the lateral axis.

8. The aerodynamic system, as set forth in claim 7, wherein the controller is further defined as being operable to measure a distance between the current position and the desired position of the movement mechanism; and wherein the controller being operable to transmit a movement signal to the movement mechanism is further defined as the controller being operable to transmit a movement signal to the movement mechanism corresponding to the measured distance between the current position and the desired position of the movement mechanism to move the movement mechanism from the current position to the desired position, such that the aerodynamic element moves from the current location to the desired location along the longitudinal axis and/or the lateral axis.

9. The aerodynamic system, as set forth in claim 8, wherein the controller is further defined as being operable to:

receive and process the input signals;

determine a current location of the aerodynamic center of the vehicle, relative to the center of gravity of the body, as a function of at least one input signal; and determine a required location of the aerodynamic center of the vehicle, relative to the center of gravity of the body, as a function of at least one input signal.

10. A method of controlling an aerodynamic force acting on a vehicle having a body located along a longitudinal axis and a lateral axis and an aerodynamic element configured to intersect an ambient airflow as the vehicle moves through the ambient airflow, the method comprising:
- determining, with a controller, a desired location of the aerodynamic element;
- determining, with the controller, a desired position of a movement mechanism corresponding to the desired location of the aerodynamic element, wherein the movement mechanism movably couples the aerodynamic element and the body, and is configured to selectively move the aerodynamic element relative to the body, along a longitudinal axis and/or a lateral axis;
- transmitting a movement signal to the movement mechanism to change position to the desired position and thereby change location of the aerodynamic element to the desired location along the longitudinal axis and/or the lateral axis;
- determining a required location of an aerodynamic center of the vehicle along the longitudinal axis and/or the lateral axis, as a function of at least one input signal;
- wherein determining a desired position of the movement mechanism is further defined as determining a desired position of the movement mechanism corresponding to the required location of the aerodynamic center of the vehicle along the longitudinal axis and/or the lateral axis; and
- wherein transmitting a movement signal is further defined as transmitting a movement signal to the movement mechanism to change position to the desired position to thereby change location of the aerodynamic element to the desired location and to thereby change location of the aerodynamic center to the required location.

11. The method, as set forth in claim 10, further comprising detecting a required operating mode of the vehicle; and
wherein determining, with the controller, a required location of the aerodynamic center of the vehicle is a function of the detected required operating mode of the vehicle.

12. The method, as set forth in claim 11, further comprising:
- determining a center of gravity of the vehicle;
- determining, with the controller, a current location of the aerodynamic center of the vehicle along the longitudinal axis and/or the lateral axis; and
- wherein determining, with the controller, the required location of the aerodynamic center is further defined as determining, with a controller, the required location of the aerodynamic center, relative to the center of gravity of the vehicle and as a function of at least one operating condition of the vehicle.

13. The method, as set forth in claim 11, wherein the at least one operating condition of the vehicle is at least one of a vehicle speed of the vehicle, relative to a ground surface, a steering angle of the vehicle.

14. The method, as set forth in claim 13, wherein the at least one operating condition of the vehicle is at least one of a yaw rate, a longitudinal acceleration, and a lateral acceleration of the vehicle relative to the ground surface.

15. The method, as set forth in claim 13, wherein determining, with the controller, the required location of the aerodynamic center, is further defined as determining, with the controller, the required location of the aerodynamic center to be longitudinally disposed between a forward end of the vehicle and the center of gravity of the vehicle, as a function of the at least one operating condition of the vehicle being a predefined longitudinal acceleration.

16. The method, as set forth in claim 13, wherein determining, with the controller, the required location of the aerodynamic center, is further defined as determining, with the controller, the required location of the aerodynamic center to be laterally disposed inward, relative to the center of gravity of the vehicle, as a function of the at least one operating condition of the vehicle being a predefined yaw rate.

17. The method, as set forth in claim 13, wherein determining, with a controller, the required location of the aerodynamic center, is further defined as determining, with a controller, the required location of the aerodynamic center to be longitudinally disposed between the center of gravity of the vehicle and a rear end of the vehicle, as a function of the at least one operating condition of the vehicle being a predefined longitudinal deceleration.

* * * * *